US011217036B1

(12) United States Patent
Albuz et al.

(10) Patent No.: US 11,217,036 B1
(45) Date of Patent: Jan. 4, 2022

(54) AVATAR FIDELITY AND PERSONALIZATION

(71) Applicant: Facebook Technologies, LLC, Menlo Park, CA (US)

(72) Inventors: Elif Albuz, Los Gatos, CA (US); Chad Vernon, South San Francisco, CA (US); Shu Liang, Redwood City, CA (US); Peihong Guo, San Mateo, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/595,285

(22) Filed: Oct. 7, 2019

(51) Int. Cl.
*G06T 19/20* (2011.01)
*G06K 9/00* (2006.01)

(52) U.S. Cl.
CPC .......... *G06T 19/20* (2013.01); *G06K 9/00268* (2013.01); *G06T 2219/2012* (2013.01); *G06T 2219/2021* (2013.01)

(58) Field of Classification Search
CPC ............. G06T 19/20; G06T 2219/2012; G06T 2219/2021; G06K 9/00268
See application file for complete search history.

(56) References Cited

U.S. PATENT DOCUMENTS

| | | | | |
|---|---|---|---|---|
| 6,556,196 B1* | 4/2003 | Blanz | ................ | G06K 9/00275 345/419 |
| 8,026,918 B1 | 9/2011 | Murphy | | |
| 2009/0044113 A1* | 2/2009 | Jones | ...................... | G06T 13/40 715/707 |
| 2015/0123967 A1* | 5/2015 | Quinn | ...................... | G06T 7/75 345/420 |
| 2016/0314341 A1* | 10/2016 | Maranzana | ........ | G06K 9/00214 |
| 2018/0150993 A1* | 5/2018 | Newell | ................... | H04N 5/00 |
| 2019/0130172 A1* | 5/2019 | Zhong | ................ | G06K 9/00268 |
| 2020/0306640 A1 | 10/2020 | Kolen et al. | | |
| 2020/0312002 A1* | 10/2020 | Comploi | ................. | G06T 17/20 |

* cited by examiner

*Primary Examiner* — Jennifer Mehmood
*Assistant Examiner* — Jed-Justin Imperial
(74) *Attorney, Agent, or Firm* — Potomac Law Group, PLLC; Dannon G. Allbee

(57) ABSTRACT

An avatar personalization engine can generate personalized avatars for a user by creating a 3D user model based on one or more images of the user. The avatar personalization engine can compute a delta between the 3D user model and an average person model, which is a model created based on the average measurements from multiple people. The avatar personalization engine can then apply the delta to a generic avatar model by changing measurements of particular features of the generic avatar model by amounts specified for corresponding features identified in the delta. This personalizes the generic avatar model to resemble the user. Additional features matching characteristics of the user can be added to further personalize the avatar model, such as a hairstyle, eyebrow geometry, facial hair, glasses, etc.

20 Claims, 10 Drawing Sheets

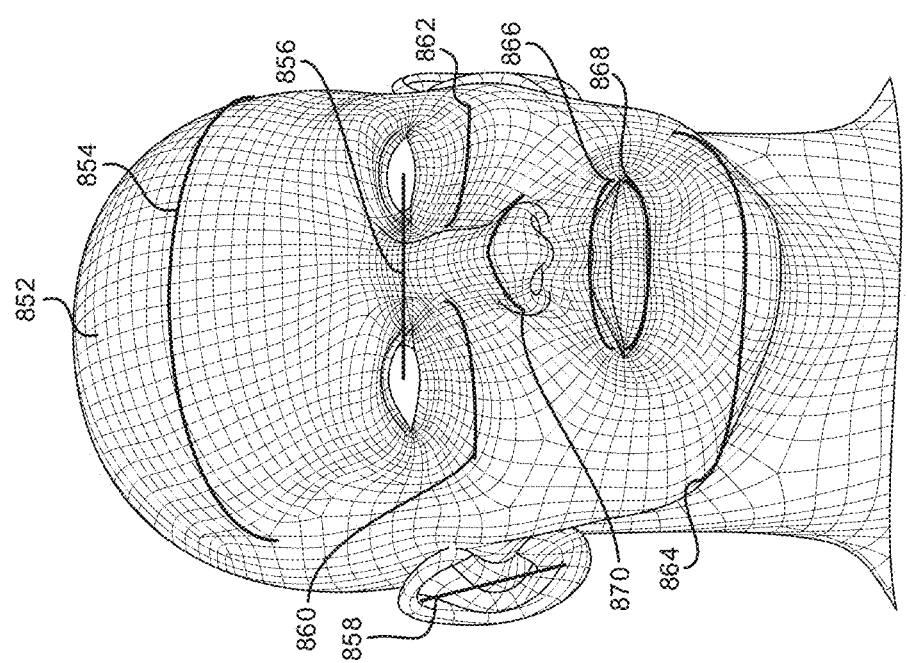
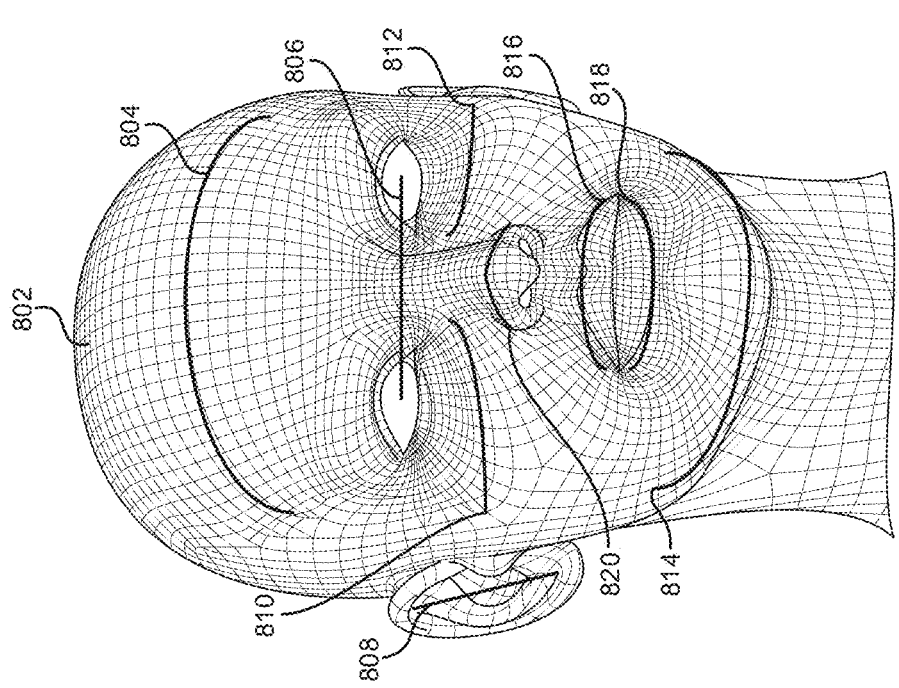
FIG. 8

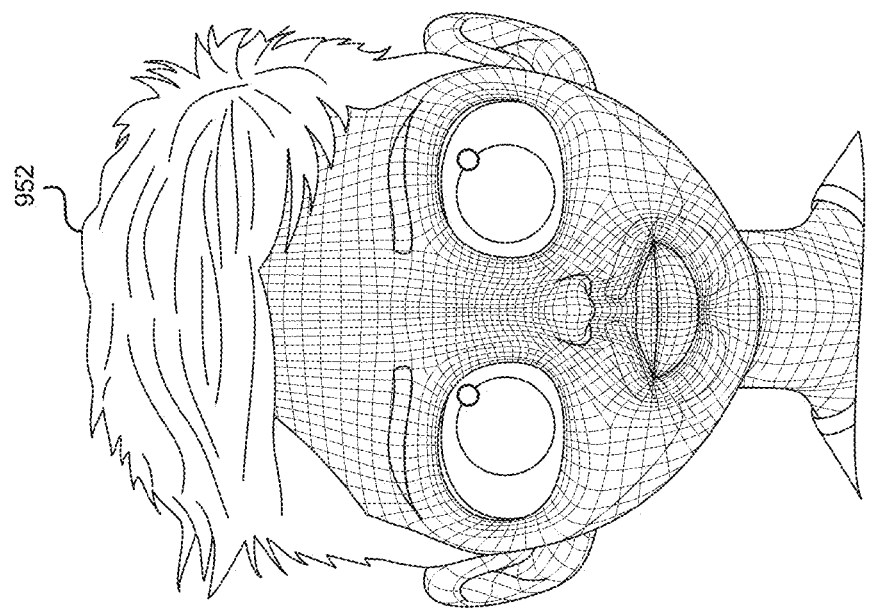
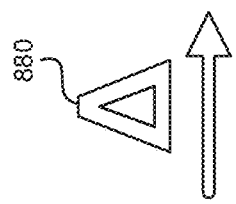
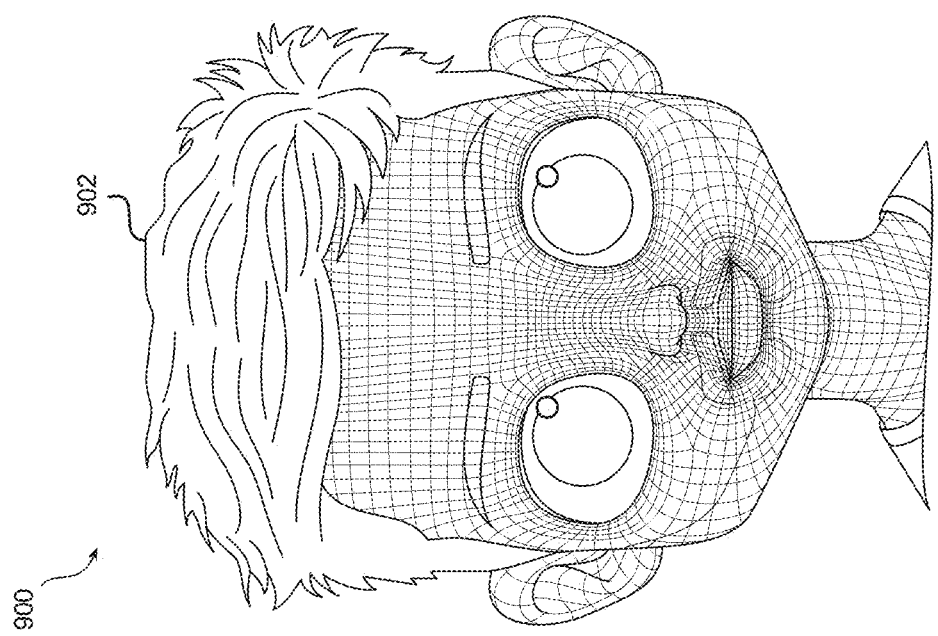
FIG. 9

AVATAR FIDELITY AND PERSONALIZATION

TECHNICAL FIELD

The present technology relates generally to personalized avatars and methods for generating personalized avatars.

BACKGROUND

Avatars are a graphical representation of a user, typically representing the user in an artificial reality environment such as on a social network, on a messaging platform, in a game, or in a 3D environment. In various systems, users can control avatars, e.g., using game controllers, keyboards, etc., or a computing system can monitor movements of the user and can cause the avatar to mimic the movements. Often, users can customize their avatar, such as by selecting body and facial features, adding clothing and accessories, setting hairstyles, etc. A user can have different avatars in different genres or for different applications. For example, a user can have a cartoon avatar she uses in a virtual reality game and a wallaby avatar she uses in a chat application.

BRIEF DESCRIPTION OF THE DRAWINGS

FIG. 8 is a conceptual diagram illustrating an example determination of a delta between a user model and an average person model.

FIG. 9 is a conceptual diagram illustrating an example of applying a delta to a generic avatar to create a personalized avatar.

The techniques introduced here may be better understood by referring to the following Detailed Description in conjunction with the accompanying drawings, in which like reference numerals indicate identical or functionally similar elements.

DETAILED DESCRIPTION

Figure 1:
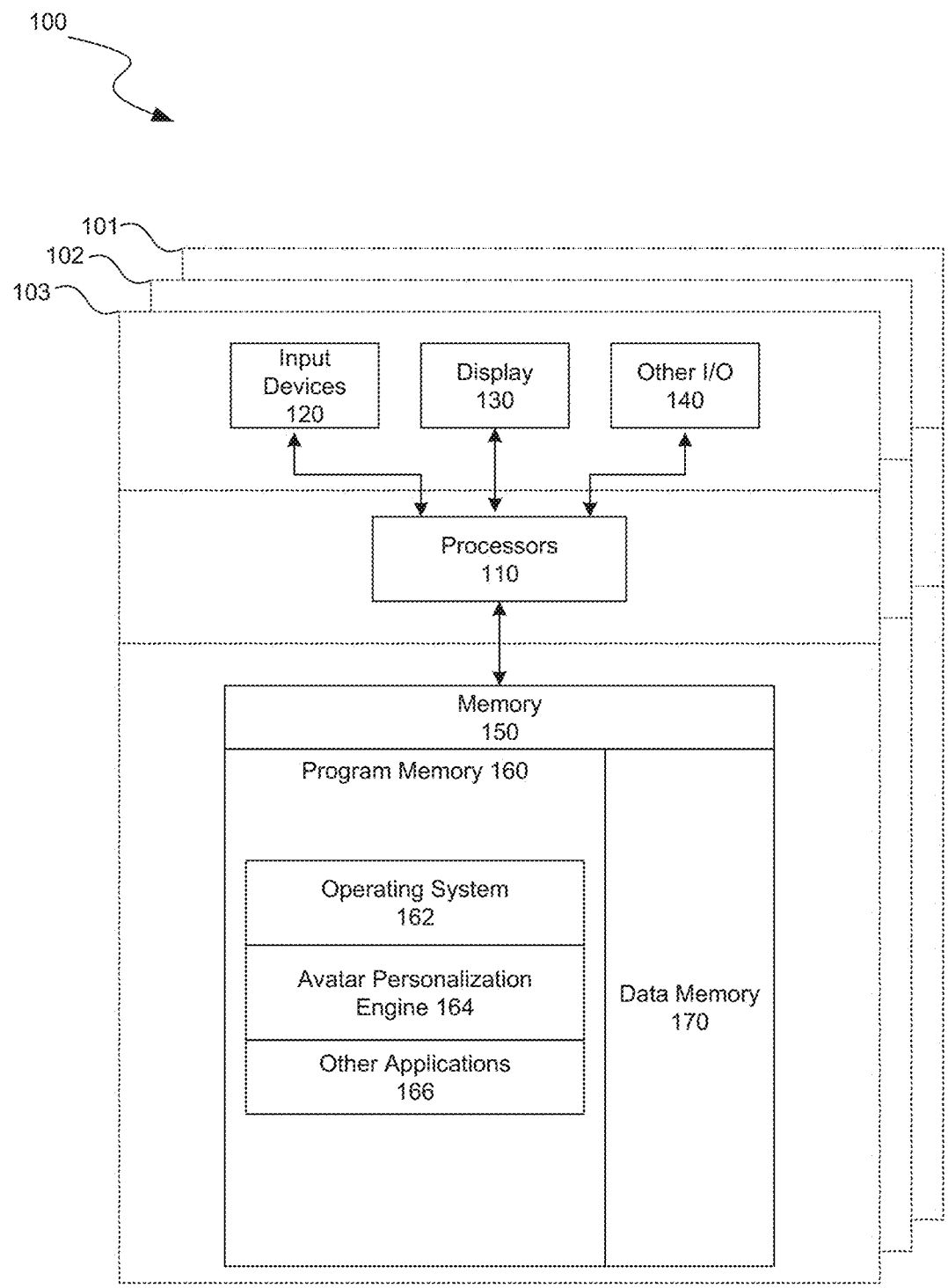
FIG. 1 is a block diagram illustrating an overview of devices on which some implementations of the present technology can operate.

Embodiments for generating personalized avatars are described herein. An avatar personalization engine can generate personalized avatars by creating a user model and computing a delta between the user model and an average person model. The avatar personalization engine can then apply the delta to a generic avatar model, which personalizes the generic avatar model to resemble the user. Additional specifics can be added to the personalized model avatar, such as hairstyle, eyebrow geometry, glasses, etc., to match the user. In various implementations, the avatar personalization engine can be used to create personalized avatars for just a user's head/bust or for their whole body.

In an example execution of the avatar personalization engine, a user can submit biographic data such as one or more images taken with a mobile device. The avatar personalization engine can create a user 3D model based on these images, such as by identifying various curvatures and/or size, spacing, and position of features. The avatar personalization engine can also identify surface texture and stylization to apply to the user 3D model, e.g., by identifying features of the user in the user images and mapping parts of the user images to corresponding features of the user 3D model. In some implementations, a machine learning process, trained to generate user 3D models from one or more user images, can be employed to augment or replace an algorithmic user 3D model construction process. In some implementations, additional user characteristics such as hairstyle, piercings, eye color, glasses, scars, tattoos, makeup, eyebrow geometry, etc., can also be identified and applied to the user 3D model. For example, the avatar personalization engine can categorize a user hairstyle and can select and apply a corresponding hair configuration from a library of hairstyles.

The avatar personalization engine can also obtain a 3D model or measurements of an "average person." Similar to creating the user 3D model, the average person 3D model can be generated from user measurements, images, etc. using algorithmic and/or machine learning techniques. However, the average person 3D model can be created based on average measurements across a set of multiple people instead of a single user.

The avatar personalization engine can compare the user 3D model and the average person 3D model to determine a difference or delta between the two models. The difference or delta can include measurements of curvature, size, and position differences between the two models. In some implementations, the avatar personalization engine can use a limited set of measurements, such as differences in distances and curves for curves across the model foreheads, chins, cheeks, noses, etc., distances between eyes, length of ears and nose, etc. In other implementations, the avatar personalization engine can compute many more, such as tens, hundreds, or thousands of differences between the models or can use a continuous curvature variation for the entire head/body parts that the avatar personalization engine modeled.

The avatar personalization engine can also obtain a generic avatar 3D model. For example, this can be an avatar model made with a specific style or in a specific genre (e.g., cartoon, dog, elf, etc.) The avatar personalization engine can apply the delta it computed to the generic avatar 3D model. For example, curvatures and distance can be specified on the generic avatar 3D model matching some or all of those specified in the delta. The avatar personalization engine can adjust these curvatures and distances on the generic avatar 3D model to create a personalized avatar for the user. For example, if the user has longer ears, a broader forehead, and higher-curve cheekbones, as compared to the set people used to create the average person model, then these characteristics will be reflected in the user's personalized avatar. The avatar personalization engine can further customize the personalized avatar by applying additional user characteristics the avatar personalization engine previously identified for the user, such as hairstyle, glasses, eye color, piercings, etc. In some implementations, the applied features can be selected from a library associated with the generic avatar or a genre of avatars. For example, if the user is characterized as having short, black hair and the avatar genre is cartoon, a cartoonish version of short black hair can be selected and applied to the personalized avatar.

The avatar personalization engine can then supply the personalized avatar for use in various applications such as artificial reality environments, games, messaging or communications, social networks, etc. In some implementations, the personalized avatar can be a full 3D model, able to translate movements in 3D, while in other implementations, the personalized avatar can be only 2D or can be a single image.

Embodiments of the disclosed technology may include or be implemented in conjunction with an artificial reality system. Artificial reality or extra reality (XR) is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a 3D effect to the viewer). Additionally, in some embodiments, artificial reality may be associated with applications, products, accessories, services, or some combination thereof that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems in which light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

While there are existing systems for users to select body parts in a genre and to manually personalize them, the resulting "personalized" avatars tend not to particularly resemble the user. In addition, this type of existing personalization system is time-consuming to operate, often requiring the user to proceed through many selection screens. While professionals can create personalized, stylized avatars, this is an incredibly labor-intensive process, requiring professional designers with knowledge of 3D modeling to manually contour the model. The avatar personalization systems and processes described herein overcome these problems associated with conventional avatar personalization techniques, and are expected to generate highly personalized avatars that are quick and easy to create. Furthermore, by allowing various results of the avatar creation process (such as the delta between the user and the average person) to be stored and re-used, the disclosed techniques for creating personalized models can be faster and less computationally expensive than existing systems. In addition, instead of being an analog of existing techniques for manual creation of personalized avatars, the avatar personalization systems and processes described herein are rooted in computerized 3D modeling and analysis. For example, the existing personalization techniques rely on a designer's intuition and education to customize an avatar without any notion of an average person model or a delta between the user model and the average person model.

Several implementations are discussed below in more detail in reference to the figures. FIG. 1 is a block diagram illustrating an overview of devices on which some implementations of the disclosed technology can operate. The devices can comprise hardware components of a computing system 100 that can create personalized avatars. In various implementations, the computing system 100 can include a single computing device 103 or multiple computing devices (e.g., computing device 101, computing device 102, and computing device 103) that communicate over wired or wireless channels to distribute processing and share input data. In some implementations, the computing system 100 can include a standalone headset capable of providing a computer created or augmented experience for a user without the need for external processing or sensors. In other implementations, the computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

The computing system 100 can include one or more processor(s) 110 (e.g., central processing units (CPUs), graphical processing units (GPUs), holographic processing units (HPUs), etc.) The processors 110 can be a single processing unit or multiple processing units in a device or distributed across multiple devices (e.g., distributed across two or more of computing devices 101-103).

The computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

The processors 110 can be coupled to other hardware devices, for example, with the use of an internal or external bus, such as a PCI bus, SCSI bus, wireless connection, etc. The processors 110 can communicate with a hardware controller for devices, such as for a display 130. The display 130 can be used to display text and graphics. In some implementations, the display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or XR display (such as a heads-up display device or a head-mounted device), and so on. Other input/output (I/O) devices 140 can also be coupled to the processor, such as a network chip or card, video chip or card, audio chip or card, USB, firewire or other external device, camera, printer, speakers, CD-ROM drive, DVD drive, disk drive, etc.

The computing system 100 can include a communication device capable of communicating wirelessly or wire-based with other local computing devices or a network node. The communication device can communicate with another device or a server through a network using, for example, TCP/IP protocols. The computing system 100 can utilize the communication device to distribute operations across multiple network devices.

The processors 110 can have access to a memory 150, which can be contained on one of the computing devices of the computing system 100 or can be distributed across of the multiple computing devices of the computing system 100 or other external devices. A memory includes one or more hardware devices for volatile or non-volatile storage and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. The memory 150 can include program memory 160 that stores programs and software, such as an operating system 162, an avatar personalization engine 164, and other application programs 166. The memory 150 can also include data memory 170 that can include, e.g., person models and measurements, measurements of differences for curves and distances between features of user models and measurements ("deltas"), avatar models in various genres, additional characteristics selectable for the various genres, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
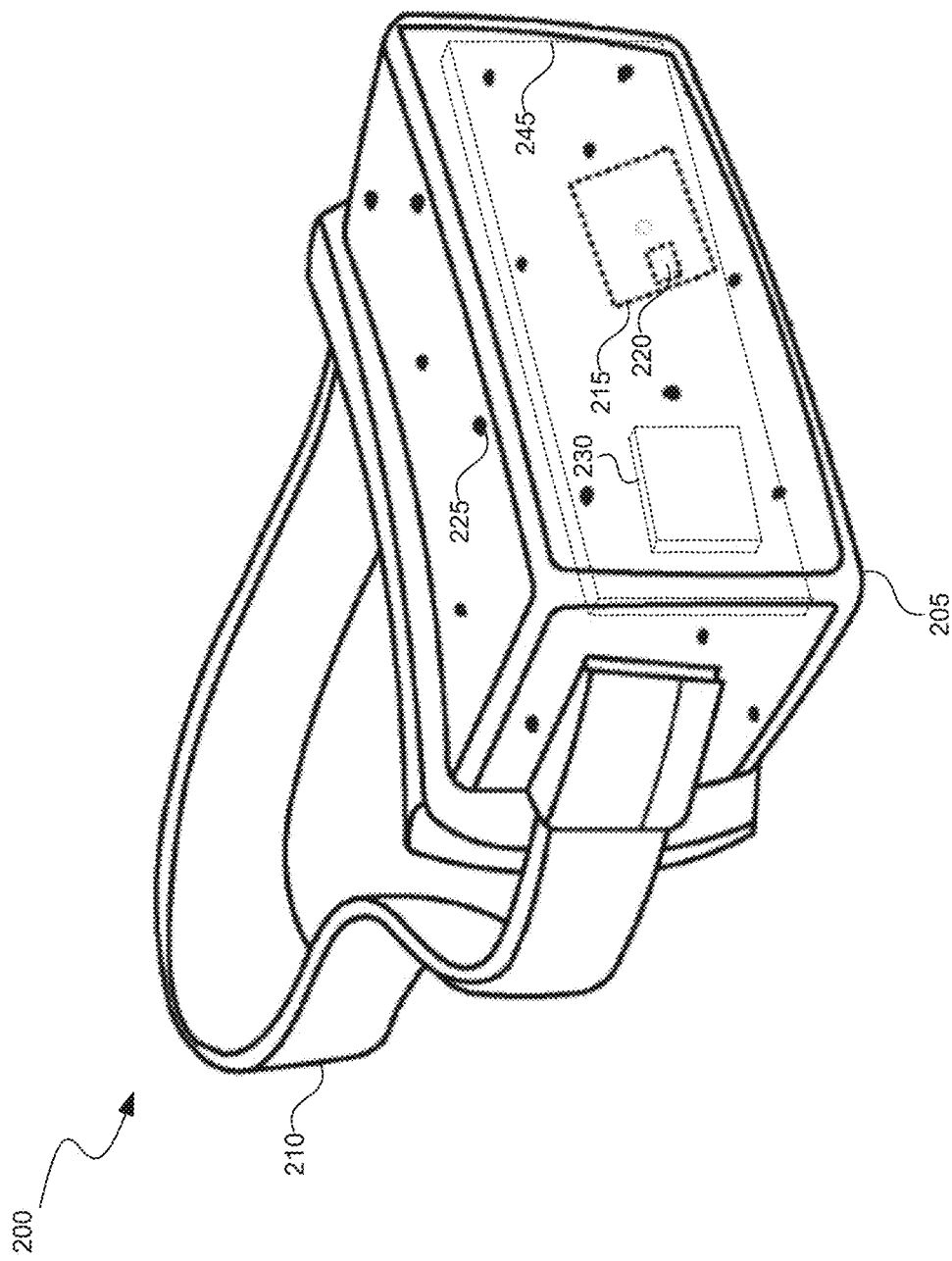
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams, which create light points on real objects around the HMD 200. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include a liquid crystal display (LCD), an organic light-emitting diode (OLED) display, an active-matrix organic light-emitting diode display (AMOLED), a display including one or more Quantum dot light-emitting diode (QLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200), which the PC can use, in combination with output from the IMU 215 and position sensors 220, to determine the location and movement of the HMD 200.

In some implementations, the HMD 200 can be in communication with one or more other external devices, such as controllers (not shown), which a user can hold in one or both hands. The controllers can have their own IMU units, position sensors, and/or can emit further light points. The HMD 200 or external sensors can track these controller light points. The compute units 230 in the HMD 200 or the core processing component can use this tracking, in combination with IMU and position output, to monitor hand positions and motions of the user. The controllers can also include various buttons a user can actuate to provide input and interact with virtual objects. In various implementations, the HMD 200 can also include additional subsystems, such as an eye tracking unit, an audio system, various network components, etc.

Figure 2B:
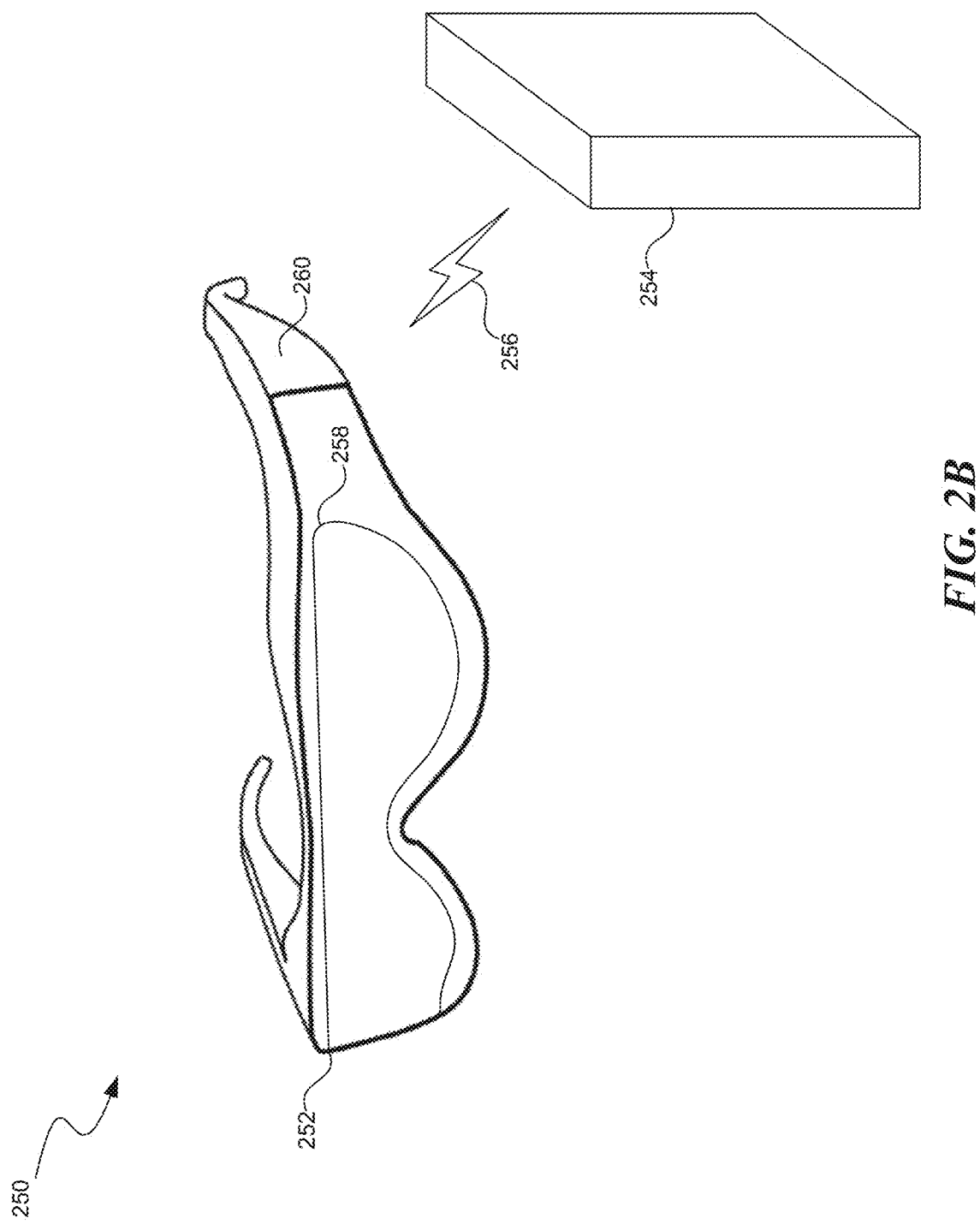
FIG. 2B is a wire diagram illustrating a mixed reality headset which can be used in some implementations of the present technology.

FIG. 2B is a wire diagram of a mixed reality HMD system 250, which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similar to the HMD 200, the HMD system 250 can also include motion and position tracking units, cameras, light sources, etc., which allow the HMD system 250 to track itself in 6DoF, map virtual objects to appear as stationary as the HMD 252 moves, and have virtual objects react to gestures and other real-world objects.

Figure 3:
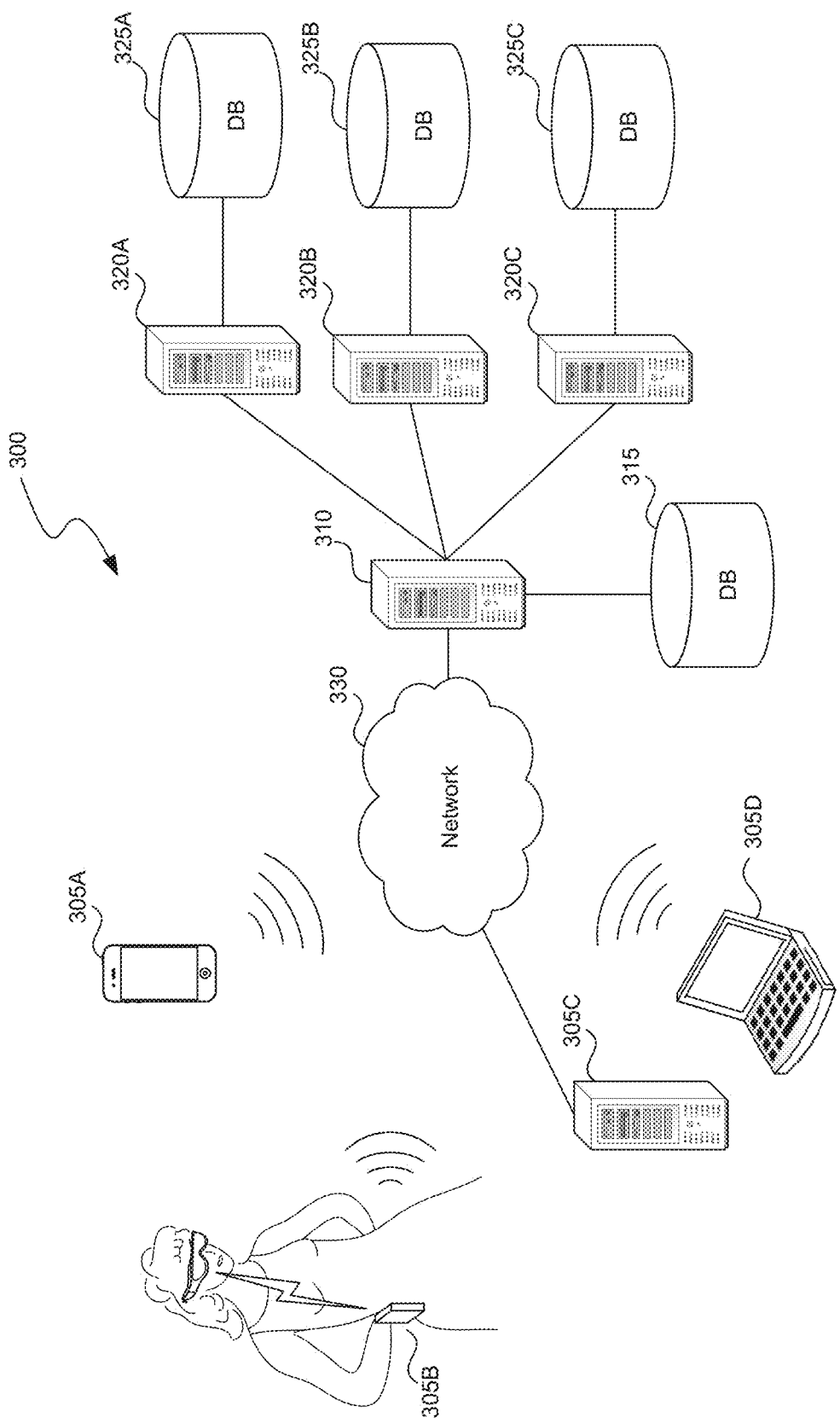
FIG. 3 is a block diagram illustrating an overview of an environment in which some implementations of the present technology can operate.

FIG. 3 is a block diagram illustrating an overview of an environment 300 in which some implementations of the disclosed technology can operate. The environment 300 can include one or more client computing devices 305A-D, examples of which can include the computing system 100. In some implementations, some of the client computing devices (e.g., the client computing device 305B) can be the HMD 200 or the HMD system 250. Client computing devices 305 can operate in a networked environment using logical connections through a network 330 to one or more remote computers, such as a server computing device.

In some implementations, server computing device 310 can be an edge server, which receives client requests and coordinates fulfillment of those requests through other server computing devices, such as server computing devices 320A-C. Server computing devices 310 and 320 can comprise computing systems, such as the computing system 100. Although each server computing device 310 and 320 is displayed logically as a single server, server computing devices can each be a distributed computing environment encompassing multiple computing devices located at the same or at geographically disparate physical locations. In some implementations, each server computing device 320 corresponds to a group of servers.

The client computing devices 305 and server computing devices 310 and 320 can each act as a server or client to other server/client device(s). Server computing device 310 can connect to a database 315. Server computing devices 320A-C can each connect to a corresponding database 325A-C. As discussed above, each server computing device 320 can correspond to a group of servers, and each of these servers can share a database or can have their own database. Although databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the internet or some other public or private network. Client computing devices 305 can be connected to network 330 through a network interface, such as by wired or wireless communication. While the connections between server computing devices 310 and 320 are shown as separate connections, these connections can be any kind of LAN, WAN, wired, or wireless network, including the network 330 or a separate public or private network.

Figure 4:
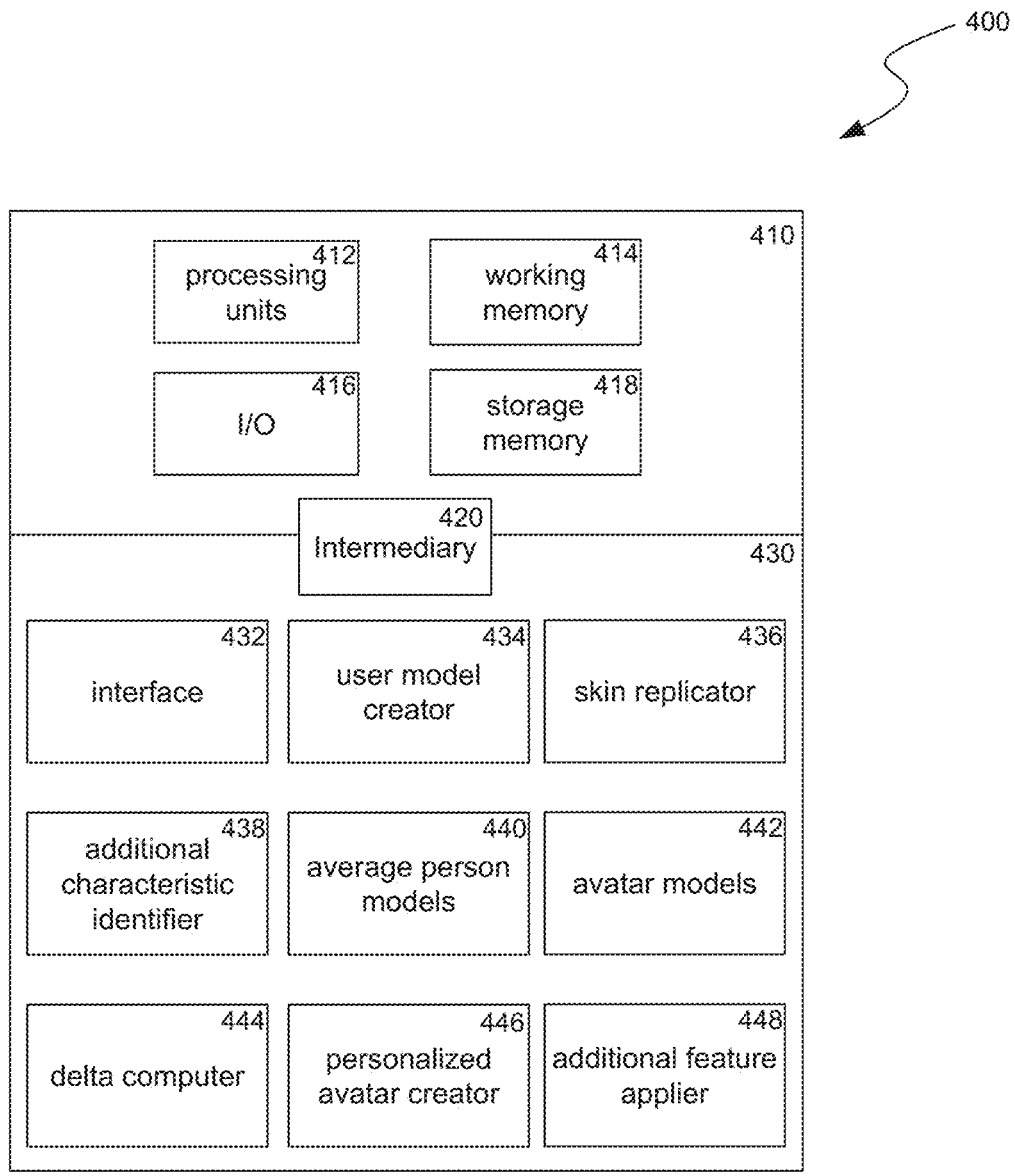
FIG. 4 is a block diagram illustrating components which, in some implementations, can be used in a system employing the disclosed technology.

FIG. 4 is a block diagram illustrating components 400 which, in some implementations, can be used in a system employing the disclosed technology. The components 400 can be included in one device of the computing system 100 or can be distributed across multiple of the devices of the computing system 100. The components 400 include hardware 410, intermediary 420, and specialized components 430. As discussed above, a system implementing the disclosed technology can use various hardware including processing units 412, working memory 414, I/O devices 416 (e.g., cameras, displays, IMU units, network connections, etc.), and storage memory 418. In various implementations, the storage memory 418 can be one or more of: local devices, interfaces to remote storage devices, or combinations thereof. For example, the storage memory 418 can be one or more hard drives or flash drives accessible through a system bus or can be a cloud storage provider (such as in the databases 315 or 325) or other network storage accessible via one or more communications networks. In various implementations, the components 400 can be implemented in a client computing device such as the client computing devices 305 or on a server computing device, such as the server computing devices 310 or 320.

The intermediary 420 can include components which provide an interface between the hardware 410 and the specialized components 430. For example, the intermediary 420 can include an operating system, services, drivers, a basic input output system (BIOS), controller circuits, or other hardware or software systems.

The specialized components 430 can include software or hardware configured to perform operations for generating personalized avatars. The specialized components 430 can include a user model creator 434, a skin replicator 436, an additional characteristic identifier 438, average person models 440, avatar models 442, a delta computer 444, a personalized avatar creator 446, an additional feature applier 448, and components and APIs, which can be used for providing user interfaces, transferring data, and controlling the specialized components, such as an interface 432. In some implementations, the components 400 can be in a computing system that is distributed across multiple computing devices or can be an interface to a server-based application executing one or more of the specialized components 430.

The user model creator 434 can receive, via interface 432, user biographic data, such as images, facial or body measurements, position data, etc. The user model creator 434 can then create a 3D model of the user. For example, the user model creator 434 can receive one or more images or a video of the user, determine depth information and parts of the image(s) that depict the user, and use this information to build a user 3D model. Additional details on creating a user 3D model are described below in relation to blocks 506, 602, and 604.

The skin replicator 436 can identify, from the user images, surface textures and stylizations matching the user. For example, the skin replicator 436 can identify parts of the images corresponding to various facial features and extract the surface texture for those parts as a "skin" overlay, which can be applied to the user 3D model or an avatar model.

Additional details on identifying surface textures and stylizations for the user are described below in relation to blocks 506, 606, and 608.

The additional characteristic identifier 438 can identify, in the user images, whether or what type of additional characteristics a user has. For example, additional characteristics can include one or more of: glasses, facial hair, hair color, hairstyle, hairline, eye color, eyebrow geometry, glasses, piercings, tattoos, facial hair, scars, makeup or makeup style, etc. In some implementations, the additional characteristic identifier 438 can apply a separate classifier (e.g., a machine learning model) for each type of additional characteristic to identify whether the user has that characteristic and which classification of that characteristic the user has. Additional details on identifying additional user characteristics are described below in relation to block 610.

The average person models 440 can be one or more models that amalgamate measurements from multiple people. An average person model can be a set of measurements, each corresponding to a part of a body or face or can be a 3D model of a part of a body or face. Person measurements can include measurements of relative positions between features, sizes of features, feature curvatures, etc. In some implementations, measurements from multiple people can be obtained and these measurements, for each feature, can be averaged to create the average person model. For example, the measurements can be of a jawline, forehead centerline, nose peak, cheeks, eyebrows, ears, etc. from multiple people. The values of each type of measurement across people can be averaged. The results can be stored as an average person model or can be used to generate an average person 3D model. In some implementations, the measurements can be more granular, such as by taking hundreds or thousands of measurements for each person. In some implementations, a 3D model for each individual person can be created and these 3D models can be averaged to get an average person model 440. In some implementations, the average person model 440 can be in various categories corresponding to common characteristics among the people from whom the measurements were taken. For example, where all the people for a model were female, there can be a female average person model. A similar classification can be applied for one or more other features, such as age ranges or ethnicity. Additional details on average person models are described below in relation to block 508.

The avatar models 442 can be models (e.g., 2D or 3D models) of characters. Each avatar model 442 can have a set of specified measurements, which can be adjusted in various dimensions, such as by changing a feature size, position, or curvature. The avatar models 442 can be generic avatars created to define a genre such as cartoon, alien, dog, etc. Similar to average person models, the avatar models 442 can be created in various categories such as gender, age ranges, ethnicity, etc. Additional details on generic avatar models are described below in relation to block 510.

The delta computer 444 can receive a user model from user model creator 434 and an average person model from the average person models 440 and can determine a delta between them. In some implementations, the delta can be determined by matching body parts or facial features between the user model and the average person model and determining differences between the two. In various implementations, the delta can be one or more discrete measurements (e.g., of particular facial or body features) or can be a continuous difference between two 3D models (e.g., by overlaying the two models and determining distances between corresponding parts). Additional details on computing a delta between a user model and an average person model are described below in relation to block 508.

The personalized avatar creator 446 can receive the delta from the delta computer 444 and a generic avatar from the avatar models 442. In some implementations, the generic avatar can be selected based on a category of the user. For example, if the user is categorized as a female, a female generic avatar can be selected. The personalized avatar creator 446 can then create a personalized avatar by setting feature measurements of the personalized avatar based on amounts identified in the delta to adjust particular features of the generic avatar model. In some implementations, the delta can include a set of discrete measurement adjustments mapped to portions of a face or body (e.g., increased degree of mid-forehead curve by 8% and decrease length of mid-forehead curve by 13%) and the personalized avatar creator 446 can apply these to the generic avatar to personalize it. The avatar model can be a 3D model constructed in such a way that these adjustments to individual parts of the model automatically update surrounding areas of the avatar model, making the changes appear natural. In another implementation, the delta can be a set of vectors that can be mapped to spots on the generic avatar, specifying a change in the external curvature of the avatar model at that point. In yet other implementations, the delta can be continuous in three dimensions, defining how to grow, shrink, and contort the entire surface of the generic avatar model to personalize it. Additional details on creating personalized avatars by applying a delta are described below in relation to block 512.

The additional feature applier 448 can select additional features corresponding to the characteristics identified by the additional characteristics identifier 438 and can apply these additional features to the personalized avatar from the personalized avatar creator 446. For example, additional features can include one or more of: glasses, facial hair, hair color, hairstyle, hairline, eye color, eyebrow geometry, glasses, piercings, tattoos, facial hair, scars, makeup or makeup style, etc. In some cases, the additional features can be selected from either a general library or a library associated with the generic avatar. For example, a cartoon avatar can be associated with a library of cartoon-styled virtual hair objects, selectable based on hairstyle tags, that can be applied to the cartoon avatar. As used herein, a "library" can be any set of selectable attributes, such as a catalog of virtual objects that can be applied to the personalized avatar or a set of parameters that can be set for the avatar (e.g., the avatar can be an object with an "eye color" parameter, which can have a library of possible values such as blue, green, or brown). In various implementations, the additional feature applier 448 can be configured to apply a subset of the available additional features, such as only hairstyle and glasses. In some implementations, the generic avatar can be associated with only specific sets of additional feature libraries, which can control whether the additional feature applier 448 will apply each available additional feature. Additional details on applying additional characteristics are described below in relation to blocks 514 and 612.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
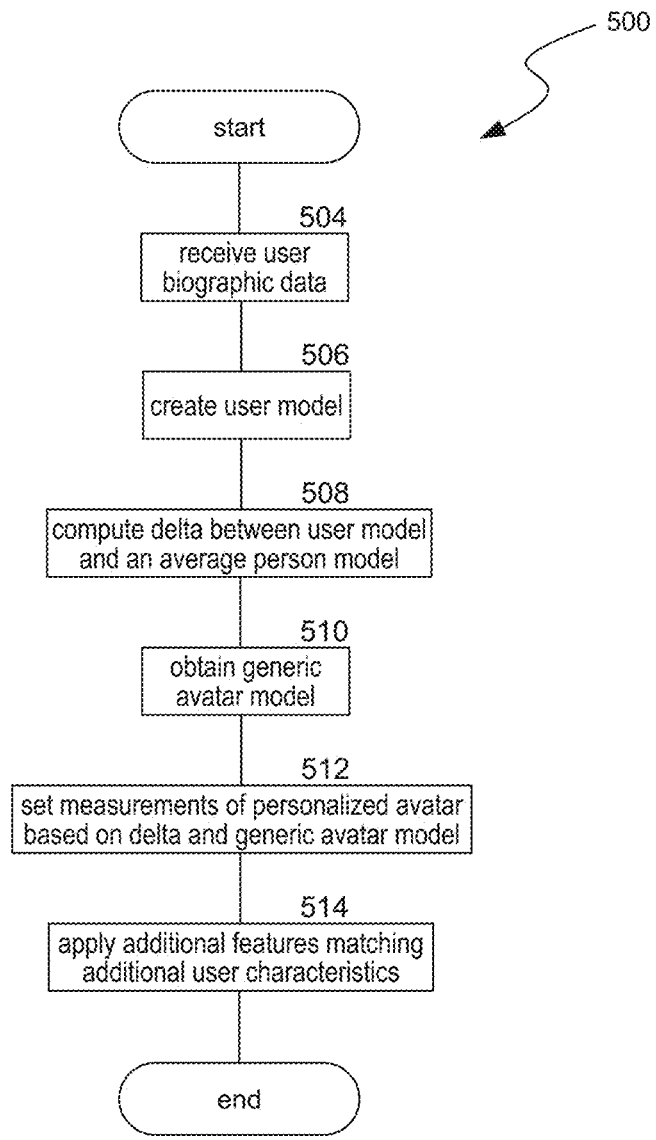
FIG. 5 is a flow diagram illustrating a process used in some implementations of the present technology for generating personalized avatars.

FIG. 5 is a flow diagram illustrating a process 500 used in some implementations for generating personalized avatars. In some implementations, the process 500 can be performed in real time, e.g., creating personalized avatars in response to a user providing input images. In other implementations, the process 500 can be performed ahead of time, e.g., creating a personalized user avatar that is then available when needed by the user. In yet other implementations, a first part of the process 500, such as the creation of a user 3D model and computing a delta between the user 3D model and an average person model, can be performed ahead of time and stored; then the remainder of the process 500—applying the delta to generic avatar models—can be performed one or more times as needed to quickly create personalized avatars in one or more genres.

At block 504, the process 500 can receive user biographic data. In various implementations, the user biographic data can be images, an existing 3D model, individual body or facial measurements, etc. In various implementations, user images can be captured by a multi-lens camera (e.g., capable of capturing depth information) or a standard camera (such as a camera integrated in most mobile phones). In some implementations, user biographic data can be a single image. In other implementations, user biographic data can be multiple images or a video. For example, a wizard can instruct a user how to position a camera at different angles around her face to capture different views. As another example, a user can take a video, moving the camera around their head or body, and the process 500 can stitch together images from the video to determine views in three dimensions, or the process 500 can match individual images to different viewpoints. In some implementations, the process 500 can accomplish this using position or inertia (IMU) data captured along with and tagged on the images.

At block 506, the process 500 can create a user model based on the user biographic data received at block 504. The process 500 can accomplish this by identifying various sizes, curvatures, distances, and other measurements of the user's face and/or body, observable in the user biographic data. For example, the process 500 can use computer vision techniques (e.g., a machine learning model) to identify user features in images such as mid-forehead, jawline, nose, eyes, cheeks, etc. The process 500 can then take measurements, such as size, position, and curvatures, of these features. The identified measurements can be those that match the measured features of an average person model, discussed below in relation to block 508. These measurements can be adjusted based on a determined angle at which the image was taken. Where multiple images are available, these measurements can be averaged across images. The process 500 can also identify textures and styles matching the user such as skin tones and shading. These textures and styles can be applied to the user model by identifying areas in the images corresponding to facial features and mapping the textures and styles from those areas to corresponding parts of the user model. The process 500 can also identify additional characteristics of the user and apply them to the user model, such as hair color and style, eye color, eyebrow geometry, glasses, piercings, tattoos, facial hair, makeup, etc. Additional details on how the process 500 can generate a user model based on the user biographic data are described below in relation to FIG. 6.

At block 508, the process 500 can compute a delta between the user model from block 506 and an average person model. An average person model can be a model based on an aggregate of multiple people's biographic data. In some implementations, the average person model can be a 3D model, created from the averages of measurements of multiple people. In other implementations, the average person model can be the set of measurements, such as body features sizes, curvatures, distances, averaged from multiple people's biometric data. For example, the process 500 can determine a delta for a specified set of facial and/or body features (e.g., jawline, mid-forehead, cheeks, etc.) and the average person model can be the average of the measurements, from multiple people, of these features. As examples, the measurements can include the size, position, and/or curvatures of one or more of: eyes, ears, lips, nose, supraorbital ridges, cheeks, jawline/chin, forehead, hairline, etc. The measurements can also specify relationships between features, such as distance between eyes or distance from the mouth to the nose. In some implementations, instead of being for particular facial features, the measurements can be more granular, such as identifying a curvature of a face between, e.g., every one degree, every two degrees, and/or every five degrees, along the face in each of an X and Y direction. In some implementations, the average person model can be a model built from the average measurements of a set of users that each match one or more determined categories for the user. For example, if the user is a male, it could be the average male person model. The average person model can be selected for one or more characteristics such as: gender, age, ethnicity, etc.

The process 500 can compute a delta by comparing the average person model with the user model determined at block 506. The delta can identify the differences in measurements between the models for the same feature or facial and/or body area. For example, the delta can identify a difference in size and/or curvature for each of the measurement types, such as between the mid-forehead curve identified in the user model and in the average person model, the distance between eyes in the user model and in the average person model, cheek curvatures in the user model and in the average person model, etc. In various implementations, the delta can be one or more discrete measurements (e.g., of particular facial or body features) or can be a continuous difference between two 3D models (e.g., by overlaying the two models and determining distances between corresponding parts). In some implementations, the delta can be a set of vectors that can be mapped to spots on the generic avatar, specifying a change in the external curvature of the avatar model at that point. In yet other implementations, the delta can be continuous in three dimensions, defining how to grow, shrink, and contort the entire surface of the generic avatar model to personalize it. In some implementations, the delta can also include differences other than shape, such as skin tone, eye color, hair color, etc. In various implementations, the delta can be determined in total values, such as a distance between the eyes of +0.5 inches, or as a percentage, such as −10% ear length. In some implementations, this delta can be stored in association with the user for future avatar creation.

At block 510, the process 500 can obtain a generic avatar model. A generic avatar model can be any 3D or 2D avatar model. Any generic avatar model can be said to define a genre. Individual generic avatar models may also conform to an avatar genre archetype, such as cartoon, elf, witch, pig, warrior, etc. In some implementations, the generic avatar model can be a model selected from a set of 3D models based on corresponding characteristics of the user and of the avatar. For example, ten generic avatar models can be defined corresponding to each of male and female for each of ages 0-15, 16-25, 26-40, 41-60, and 60 or above. If the user is identified as a 57-year-old female, the corresponding generic avatar model for females in the 41-60 age range can be used.

At block 512, the process 500 can create a personalized avatar by setting measurements of a version of the generic avatar model obtained at block 510 according to the delta computed at block 508. This "applying" the delta can include setting measurements of multiple distinguished features of the personalized avatar based on the delta from block 508 and the generic avatar model from block 510. The process 500 can set personalized model measurements by combining an amount, identified in the delta, for a distinguished feature and a corresponding measurement for the distinguished feature from the generic avatar model. For example, if the delta specifies that the user's forehead midline is 10% larger and has a greater curvature of 7 degrees as compared to the average person model, the forehead size of the generic avatar can be increased and warped to be 10% larger and have a 7 degree greater curvature. Similar changes can be made for each difference specified in the delta. In some implementations, the delta can include differences such as skin tone, which can also be applied to the generic avatar model.

At block 514, the process 500 can apply, to the personalized avatar from block 512, additional features that match characteristics of the user. For example, as part of block 506, the process 500 can have identified additional characteristics such as scars, piercings, tattoos, eye color, hairstyle, skin color or texturization, hairline, glasses, facial hair, etc. (see block 610). Where a characteristic is identified, a corresponding feature can be added to the personalized avatar from block 512. For example, if the user is wearing glasses, a pair of glasses can be added to the personalized avatar. In some implementations, the user characteristics can be given a classification, such as a named hairstyle, and the process 500 can select and apply, to the personalized model, a corresponding feature from a library of features. In some implementations, different libraries of features can be defined for different avatar genres. For example, a cartoon hairstyle library can be paired with cartoon avatars while a cat-ear library can be paired with cat avatars.

Personalized avatars generated by the process 500 can be stored in conjunction with the user for use in various applications such as in an XR environment, in a social network, in a messaging platform, etc.

Figure 6:
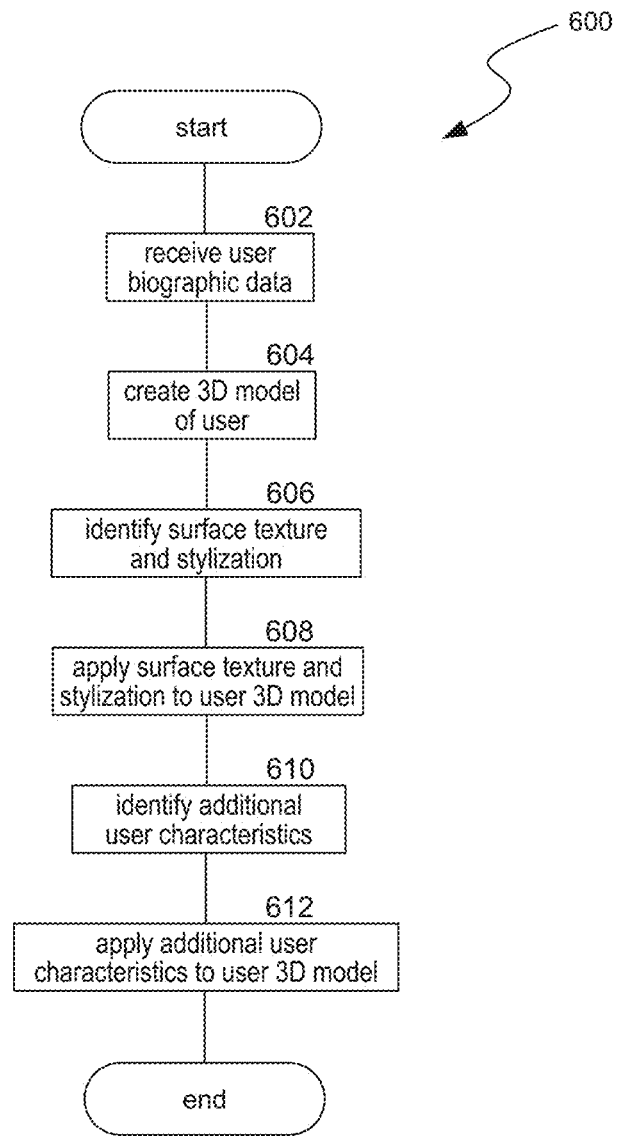
FIG. 6 is a flow diagram illustrating a process used in some implementations of the present technology for generating a user model based on user biographic data.

FIG. 6 is a flow diagram illustrating a process 600 used in some implementations for generating a user model based on user biographic data. In some implementations, the process 600 can be a subprocess of the process 500, e.g., called from block 506.

At block 602, the process 600 can receive user biographic data such as images, video, user responses to questions, measurements of the user's body or face, etc. This can be a version of the user biographic data received at block 504.

At block 604, the process 600 can create a 3D model of the user based on the user biographic data. While a 3D model is discussed below, in some implementations, a 2D model can be used instead in any of these cases. In some implementations, instead of creating a 3D model, the process 600 can determine individual measurements (e.g., curves, sizes, positions, etc.) for various facial and body features. Where the user biographic data is image-based, the process 600 can use various techniques to identify depth information from the images. In some implementations, the process 600 can use a machine learning model that can take one or more images and return dimensions for a 3D model. Instead or in addition, the process 600 can use algorithmic processes to determine depth information for a 3D model. For example, where multiple images are available, the process 600 can determine distances between where the images were taken and use these to extrapolate depth measurements for common features shown in the images. As another example, the process 600 can estimate angles between the user and the camera when an image was taken and use these estimates to determine measurements of various body or facial features shown in the image.

At block 606, the process 600 can identify surface textures and stylizations of the user's face and/or body. Where the user biographic data is image-based, the process 600 can accomplish this by identifying body or facial features within each image and extracting corresponding coloring from the image(s). The process 600 can adjust these colorings for lighting conditions and to remove shadows. Where the colorings are taken from multiple images, they can be combined based on commonly identified facial/body features in the images. Various portions of the extracted surface textures and stylizations can then be tagged to identify the body or facial features from which they originated.

At block 608, the process 600 can apply, to the 3D user model from block 604, the surface textures and stylizations identified at block 606. The process 600 can do this by applying the extracted surface textures and stylizations to identified parts of the 3D user model corresponding to the tagged body or facial features in the surface textures and stylizations.

At block 610, the process 600 can identify additional characteristics of the user. For example, the process 600 can identify a hairstyle by identifying an outline of the user's hair in images from the user biographic data and matching the outline to a category (e.g., using shape matching or a trained machine learning model). The process 600 can also identify a geometry of the user's eyebrows from the images from the user biographic data by identifying an outline of the eyebrows and determining an eyebrow size, shape, and/or position. Additional characteristics that the process 600 can identify include size, configuration, and position for one or more of: scars, tattoos, glasses, facial hair, piercings, makeup, etc., as well as skin tone, eye color, hair color, etc. In various cases, the additional characteristics can be identified as a binary value (e.g., true or false that the user has glasses or pierced ears) or as a category identification (e.g., a category of facial hair, a type of glasses, or a color of eyes).

At block 612, the process 600 can apply, to the 3D user model from block 604, the additional user characteristics identified at block 610. In some implementations, instead of applying the additional user characteristics, they are saved in association with the user to be applied to a resulting personalized avatar model (e.g., at block 514). In some implementations, adding the additional characteristics can include selecting, from an available library, a feature to apply to the user 3D model corresponding to the identified user additional characteristic, such as a hairstyle. In other implementations, the additional characteristic can be replicated onto the user 3D model, such as painting on a similar tattoo. The process 600 can return the stylized and augmented user 3D model, e.g., to process 500 as it exits block 506.

Figure 7:
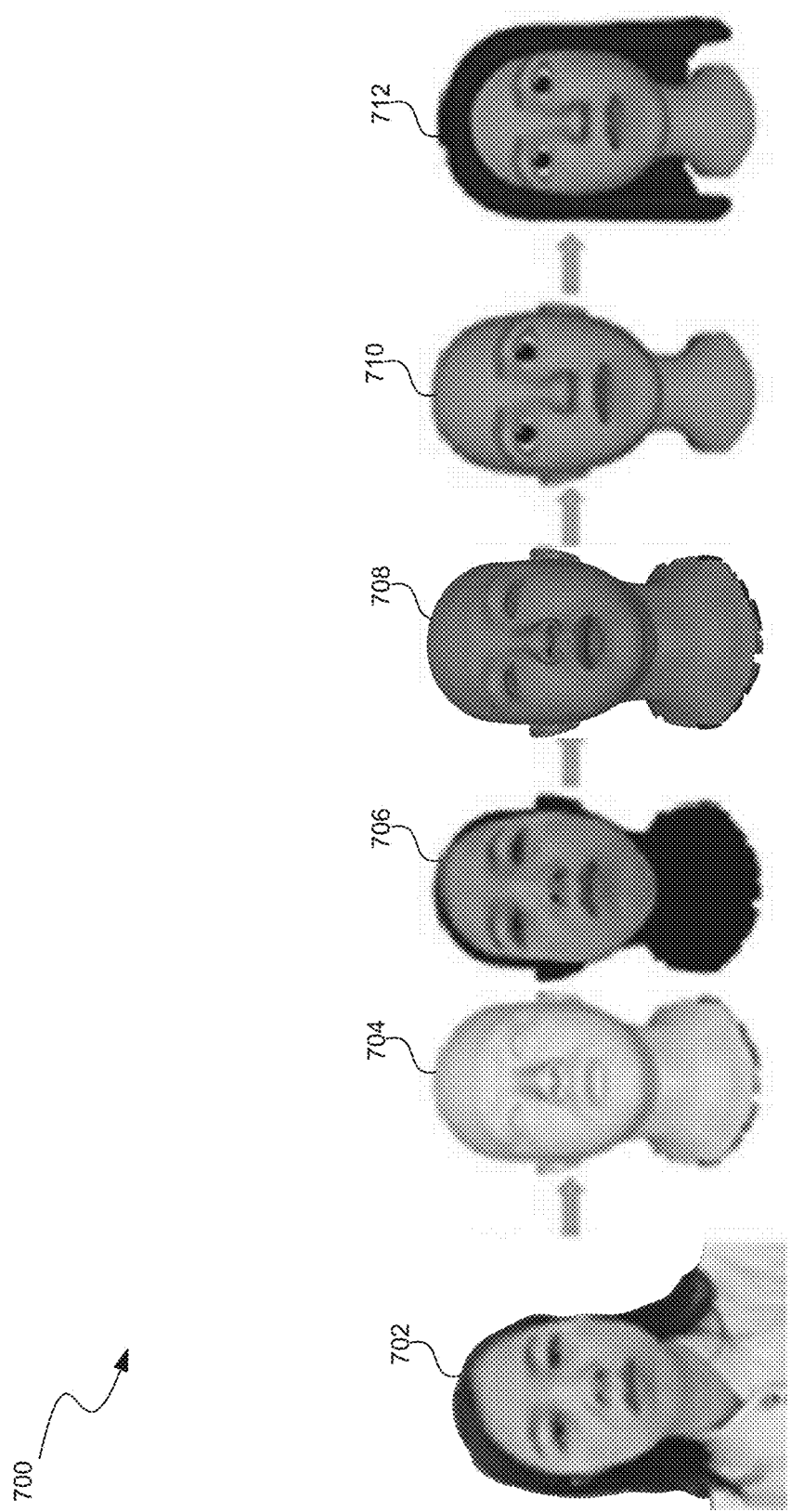
FIG. 7 is a conceptual diagram illustrating an example progression from images of a user to a personalized avatar.

FIG. 7 is a conceptual diagram illustrating an example 700 of a progression from images of a user to a personalized avatar. At step 702, the example 700 illustrates receiving user biographic data, including a user image, corresponding to block 504. At step 704, the example 700 illustrates a 3D model of the user created based on the user image, corresponding to block 604. This 3D model can be compared to an average person model (as shown in FIG. 8) to determine a delta between the user and the average person. At step 706, the example 700 illustrates identifying surface texture and stylization of the user's face, corresponding to block 606. At step 708, the example 700 illustrates applying the identified surface texture and stylization to the 3D model, corresponding to block 608. At step 710, the example 700 illustrates applying the delta between the user and the average person to a generic avatar 3D model (as shown in FIG. 9) to generate a personalized avatar, corresponding to blocks 510 and 512. At step 712, the example 700 illustrates applying, to the personalized avatar, additional features (in this case a hairstyle) that match characteristics of the user, corresponding to block 514.

FIG. 8 is a conceptual diagram illustrating an example 800 of a determination of a delta 880 between a user model 802 and an average person model 852. In the example 800, the delta 880 includes differences in curvature and size for the following facial features: mid-forehead 804 and 854, right cheek 810 and 860, left cheek 812 and 862, nose (at the tip) 820 and 870, upper lip 816 and 866, lower lip 818 and 868, and jawline 814 and 864. In addition, in the example 800, differences in length are made for the following facial features: distance between eyes 806 and 856 and length of ears 808 and 858.

FIG. 9 is a conceptual diagram illustrating an example 900 of applying a delta 880 to a generic avatar 902 to create a personalized avatar 952. In the example 900, generic avatar 902 is selected. The generic avatar 902 has specified measurements for its mid-forehead, right cheek, left cheek, nose (at the tip), upper lip, lower lip, jawline, distance between eyes, and length of ears. The delta 880 is applied to the generic avatar 902 by adjusting each of these measurements to increase or decrease its size, curvature, or position based on the values specified in the delta 880. For example, the delta 880 can specify a 10% greater curve and a 15 mm longer measurement for the upper lip of the user as compared to the average person. This results in generating the personalized avatar 952 to have a 10% greater curve and a 15 mm longer upper lip than the generic avatar 902. Similar adjustments can be made for each of the other differences specified in the delta 880. In this case, the results are bigger lips, a narrower jaw, a narrower forehead, smaller nose, smaller ears, and less curve to the cheeks. The personalized avatar 952 now includes features that resemble the user model 802, while remaining in the genre of the generic avatar 902.

Reference in this specification to "implementations" (e.g., "some implementations," "various implementations," "one implementation," "other implementations," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for generating a personalized avatar, the method comprising:
   obtaining user biographic data;
   creating a user model based on the user biographic data;
   obtaining an average person model with dimensions that are based on averages of measurements from multiple people;
   computing a delta between the user model and the average person model, by:
      computing one or more differences, for a given facial feature, between the user model for that given facial feature and the average person model for that given facial feature;
   obtaining a generic avatar model, different from the average person model, that represents a style in which the personalized avatar is to be created; and
   modifying the generic avatar model, different from the average person model, to create the personalized avatar in the style by:
      distinguishing multiple facial features of the generic avatar model having corresponding amounts, identified in the delta, specifying how the user model differs from the average person model for that distinguished facial feature; and adjusting each of the multiple distinguished facial features of the generic avatar model according to the corresponding amount, identified in the delta.

2. The method of claim 1, wherein the user biographic data comprises one or more images, each depicting at least part of a user.

3. The method of claim 1, wherein the user model comprises one or both of:
a set of measurements corresponding to dimensions or curvatures of portions of a user; or
a 3D model of at least part of the user.

4. The method of claim 3, wherein creating the user model comprises:
identifying measurements of the user's face including one or more curvatures of at least one facial feature, observable in one or more images from the user biographic data; and
creating a 3D model with dimensions of facial features matching the identified measurements.

5. The method of claim 4, wherein identifying measurements of the user's face comprises:
estimating one or more angles between the user and a camera that captured the one or more images; and
using the estimates to determine measurements of facial features shown in the one or more images.

6. The method of claim 3, wherein creating a user model comprises applying a machine learning model that receives image data and is trained to identify measurements of user features based on the image data.

7. The method of claim 1 further comprising identifying shading, textures, or styles for identified portions of the user by identifying areas in the images corresponding to facial features and mapping the shading, textures, or styles from those areas to corresponding user parts.

8. The method of claim 1 further comprising:
identifying additional user characteristics comprising one or more of: hair color, hairstyle, eye color, eyebrow geometry, glasses style, piercing configuration, facial hair configuration, or any combination thereof;
selecting, from a library, one or more additional features that correspond to the identified additional user characteristics; and
applying, to the created personalized avatar, the selected one or more additional features.

9. The method of claim 8, wherein the library is a genre-specific library associated with the generic avatar model.

10. The method of claim 1, wherein the average person model comprises a 3D model.

11. The method of claim 1, wherein the measurements from multiple people are from multiple people that share one or more specified characteristics with the user including one or more of: gender, ethnicity, an age range, or any combination thereof.

12. The method of claim 1, wherein the delta comprises at least one specification of a difference in curvatures between a part of a face of the user and a part of a facial representation from the average person model.

13. A computer-readable storage medium storing instructions that, when executed by a computing system, cause the computing system to perform operations for generating a personalized avatar, the operations comprising:
obtaining an average person model that is based on measurements from multiple people;
computing a delta between A) a user model that is based on one or more user images, and B) the average person model, by:
computing one or more differences, for a given feature, between the user model for that given feature and the average person model for that given feature;
obtaining a generic avatar model, different from the average person model, that represents a style in which the personalized avatar is to be created; and
modifying the generic avatar model, different from the average person model, to create the personalized avatar in the style by:
distinguishing multiple facial features of the generic avatar model having corresponding amounts, identified in the delta, specifying how the user model differs from the average person model for that distinguished facial feature; and
adjusting each of the multiple distinguished facial features of the generic avatar model according to the corresponding amount, identified in the delta.

14. The computer-readable storage medium of claim 13, wherein the user model is created by:
identifying measurements of the user's face including one or more curvatures of at least one facial feature, observable in the one or more user images; and
creating a 3D model with dimensions of facial features matching the identified measurements.

15. The computer-readable storage medium of claim 13, wherein the measurements from multiple people are from multiple people that share a set of one or more specified characteristics with a user depicted in the one or more user images, the set including one or more of: gender, ethnicity, an age range, or any combination thereof.

16. The computer-readable storage medium of claim 13, wherein the delta comprises at least one specification of a difference in curvatures between part of a face of the user and a part of a facial representation from the average person model.

17. A computing system for generating a personalized avatar, the computing system comprising:
one or more processors; and
a memory storing instructions that, when executed by the computing system, cause the computing system to perform operations comprising:
creating a user model based on one or more user images;
computing a delta between the user model and an average person model, by:
computing one or more differences, for a given feature, between the user model for that given feature and the average person model for that given feature; and
obtaining a generic avatar model, different from the average person model, that represents a style in which the personalized avatar is to be created; and
modifying the generic avatar model, different from the average person model, to create the personalized avatar in the style by:
distinguishing multiple facial features of the generic avatar model having corresponding amounts, identified in the delta, specifying how the user model differs from the average person model for that distinguished facial feature; and
adjusting each of the multiple distinguished facial features of the generic avatar model according to the corresponding amount, identified in the delta.

18. The computing system of claim 17, wherein the an average person model is based on measurements from multiple people that are from multiple people that share a set of one or more specified characteristics with a user depicted in the one or more user images, the set including one or more of: gender, ethnicity, an age range, or any combination thereof.

19. The computing system of claim 17, wherein the delta comprises at least one specification of a difference in curvatures between part of a face of the user and a part of a facial representation from the average person model.

20. The computing system of claim 17, wherein the adjusting at least one of the multiple distinguished facial features of the generic avatar model comprises:
   identifying, in the delta, a percentage difference between the user model and the average person model for the at least one distinguished facial feature; and
   modifying the corresponding at least one distinguished facial feature of the generic avatar model by the percentage difference.

* * * * *